Figure 1:
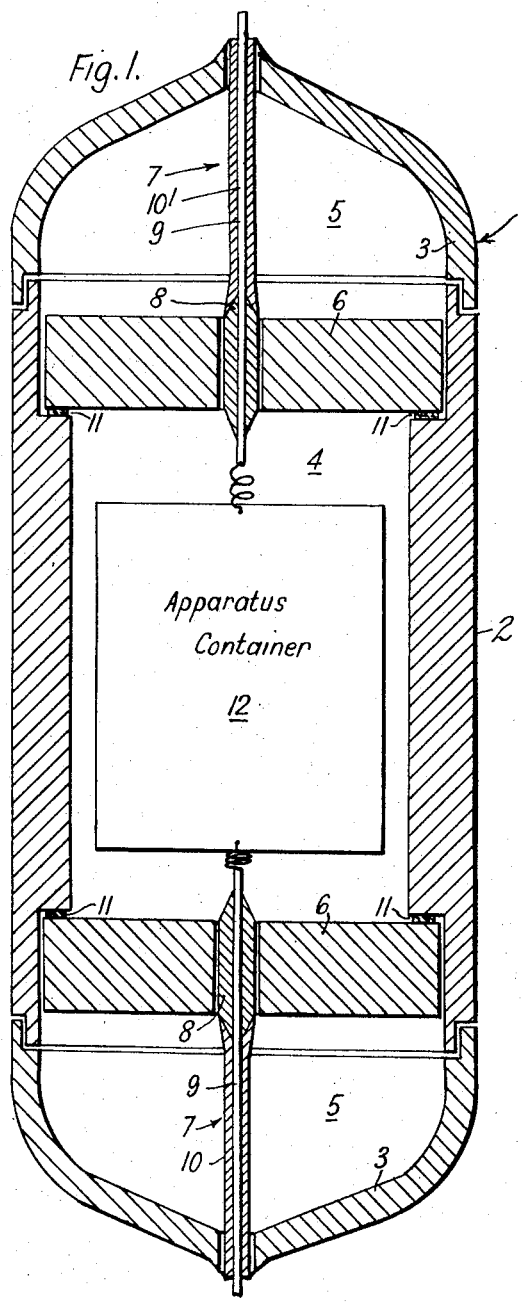

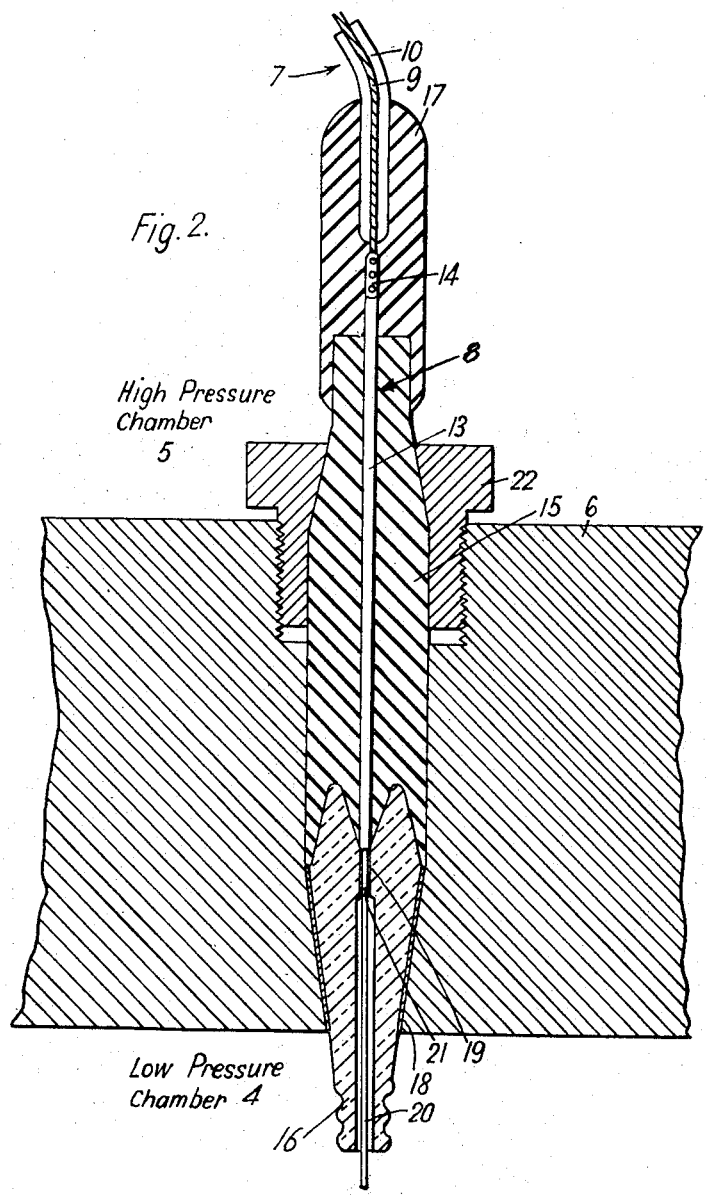

United States Patent Office 2,894,055
Patented July 7, 1959

2,894,055

SUBMARINE CABLE REPEATER HOUSINGS

George William Clarke, deceased, late of London, England, by Barclays Bank Limited, executor, London, England, and William Kirby Weston and Robert James Maddock Andrews, London, England, assignors to International Standard Electric Corporation, New York, N.Y., a corporation of Delaware Application January 18, 1954, Serial No. 404,543

Claims priority, application Great Britain January 20, 1953

10 Claims. (Cl. 174—31)

This invention relates to moisture tight seals for an electric conductor passing through a bulkhead as for example from a submarine cable into a housing containing electrical apparatus such as amplifying repeaters and is particularly adapted to such seals for housings to be laid in deep water. The problem in constructing such a housing is that the hydrostatic pressure to which it is subjected in service is usually very high and difficulty is encountered in designing satisfactory moisture-proof sealing devices through which insulated electrical connections can be led into the chamber containing the apparatus, which must be kept moisture-free and not subjected to high pressures.

The submarine cable into which such apparatus is to be connected will normally consist of a central conductor surrounded by water-proof plastic insulating material such as, for example, polymerised ethylene of high molecular weight (polythene). When polythene is referred to hereafter it is to be understood as including other suitable plastic insulants.

It is necessary to lead an insulated central conductor into a chamber containing the apparatus and to seal the entry in such a way that no water can enter the chamber. Proposals have been made to lead an insulated conductor into this chamber through a plug of insulating material similar to that of the cable insulation. Insulating materials such as polythene however, allow of the slow diffusion of water vapour and furthermore under the high hydraulic pressures involved the polythene can be slowly extruded into the low pressure apparatus chamber. Water vapour as it diffuses through a mass of polythene does not lead to any appreciable alteration in the electrical properties of the polythene. In the case of the polythene insulated cable conductor, owing to the fact that it is all, including the conductor, subjected to the full hydrostatic pressure there is no space available for water-vapour to condense around the central conductor. If, however, a polythene insulated conductor which is itself under full hydrostatic pressure is terminated in a chamber in which the pressure is approximately atmospheric, water-vapour will gradually pass into the chamber in consequence of this diffusion through the polythene and the pressure and moisture content in the chamber will gradually increase. The process may be slow but might well reduce the useful life of the apparatus in the chamber.

It is the object of the present invention to provide a moisture tight seal for an electric conductor passing through a bulkhead which will in all circumstances exclude moisture while maintaining the electrical insulation between the central conductor and the housing and which will also prevent the extrusion of the plastic insulant into the apparatus chamber.

It has been proposed to support a body of thermoplastic water resistant material by a solid auxiliary seal comprising central and outer metallic sleeves encircling the cable conductor, or an auxiliary conductor connected thereto, said sleeves having tapered outer and inner surfaces respectively cooperating with and cemented to correspondingly tapered inner and outer surfaces of an intermediate ceramic sleeve to provide a non-yielding water-proof support for the body of thermo-plastic material.

For the present invention use is made of ceramic to metal seals.

According to one feature of the present invention there is provided a method of sealing an electric conductor through a bulkhead separating a comparatively low pressure chamber from a region of much higher pressure which method consists in sealing an insulating bush of quartz or ceramic or vitreous material in a passage through said bulkhead and drawing said electric conductor into a bore in said bush of slightly less diameter than a portion of said conductor in such manner as to reduce the diameter of said portion to be a sealing fit in said bore.

According to another feature of the invention there is provided a moisture tight seal for an electric conductor through a bulkhead separating a comparatively low pressure chamber from a region of much higher pressure comprising an insulating bush of quartz or ceramic or vitreous material with the said conductor passing through and sealed into a bore therein, said bush being formed with an external conical surface pressed into a complementarily shaped seating in said bulkhead with an intervening layer of metal soft enough to flow under the applied pressure, the higher pressure maintaining said bush in its seating.

An embodiment of the invention will now be described with reference to the accompanying drawings in which:—

Fig. 1. represents diagrammatically a known type of housing adapted to contain electrical apparatus connected into a submarine cable and to be immersed in deep water.

Fig. 2 shows a moisture proof sealing device according to the invention, mounted in a pressure resisting bulkhead and permitting the passage of an insulated conductor through the bulkhead.

Referring to Fig. 1 it is to be understood that a complete housing 1 comprises a generally cylindrical pressure resisting casing 2 fitted with end caps 3 and that the housing contains a centrally placed low pressure chamber 4 and two end sections 5 forming chambers which are subjected to the full hydrostatic pressure. The end sections 5 are separated from the apparatus chamber 4 by pressure resisting bulkheads 6. The submarine cable cores 7 are brought into these end sections 5 and the cable armouring is attached to the housing while the cable cores 7 are led to sealing devices 8 passing through the bulkheads 6. The cable cores 7 each consist of a conductor 9 and an insulating coating 10.

One method of attaching the cable armour wires to the housing is described in co-pending application Serial No. 440,799, filed July 1, 1954, and is not further described or illustrated here.

The present invention is only concerned with the sealing arrangements where the conductor is passed through a bulkhead 6, the sealing arrangements necessary to prevent moisture entering the apparatus chamber 4 past the outer peripheral surfaces of the bulkheads 6 forming the subject matter of co-pending application Serial No. 404,980, filed January 19, 1954.

It will be appreciated from a study of Fig. 1 that there are three paths along which moisture could enter the apparatus chamber 4, namely along the outside of the conductors 9 between it and the insulation 10, or along the outside of the insulation 10 where it passes through the bulkhead or around the outer edge of the bulkhead. The bulkhead has to be constructed in such manner that it can be put in place after the apparatus has been installed in the apparatus chamber and as shown sealing means are provided as indicated at 11. The actual apparatus can conveniently be mounted in a closed container 12 mounted inside the apparatus chamber 4. These sealing means are only diagrammatically indicated as they form the subject matter of another application as explained above.

As Fig. 1 is only intended to be diagrammatic the various clearances between the component parts have been exaggerated. In practice of course the various components fit closely together although the actual moisture proof sealing could not be made to depend on such close fitting.

The moisture proof sealing device 8 forming the subject matter of the present invention is shown in Fig. 2.

In Fig. 2 there is shown the bulkhead 6 and the sealing device 8 of Fig. 1 which is shown in detail.

The submarine cable comprises a core 7 formed of a central conductor 9 surrounded by polythene insulation 10. The conductor 9 of the core end is conductively connected to a conducting rod 13 by means of a soldered or brazed joint 14. The rod 13 is preferably made of a harder and less ductile material than copper such as Phosphor bronze. The rod 13 then passes through a polythene plug 15 and an insulating bush 16 made of a hard insulating material such as a ceramic or vitreous material or quartz. An insulating body 17 of polythene is moulded around the conductor joint 14 and overlaps and is bonded to the cable insulation 10 and the plug 15. The insulation of the central conductor therefore consists of the cable insulation 10, the polythene body 17, the polythene plug 15, the insulating bush 16. The whole is assembled as shown and passes through a suitably shaped aperture in the bulkhead 6 so that the inner end of the conducting rod 13 projects into the apparatus chamber 4 (Fig. 1) for connection to the apparatus.

The insulator assembly described above constitutes the moisture proof seal and will now be described in greater detail. The insulating bush 16 will be referred to for convenience as the ceramic bush although it can be made of other hard insulating materials. This has a conical surface 18 which fits into a corresponding conical surface in the bore through the bulkhead 6. The conical surface 18 of the ceramic bush is provided with a coating of soft metal such as copper, or alternatively the inner conical surface of the bore through the bulkhead can be metallised with a soft metal, or both surfaces can be so treated. At the time of assembly the ceramic bush is pressed into position under a pressure in excess of the greatest hydrostatic pressure to which it will be subsequently subjected and under this pressure the soft metal will flow and will fill any imperfections in the two conical portions so that a completely moisture proof seal is formed. In order that the moisture proof anti-diffusion seal formed by the pressing together of the conical surfaces with a soft metal lining between them shall remain impervious after the assembly pressure has been released it is necessary to limit the angle between the surfaces of the cones and the axis of the cone to an angle not exceeding the critical angle of friction for the materials employed.

It may be found desirable in certain cases to increase the pressure on the soft metal layer to ensure that it flows sufficiently to form a satisfactory seal. This may conveniently be done by circumferentially grooving the surface of the metal layer thereby decreasing the contact area and conversely increasing the pressure per unit area without increasing the total applied force. The metal layer may be a thin metal cone which may then be grooved on the interior or exterior surface or both. Alternatively, the ceramic bush 16 may be grooved externally.

The axial bore through the ceramic bush 16 is slightly constricted for a short distance at the high pressure end as shown at 19 and the entrance to this constriction is flared. The conducting rod 13 is provided with an extension 20 which is of such reduced diameter that it will pass freely through the entire length of the ceramic bush 16. Between this extension and the main portion of the conducting rod 13 there is a short length 21 the diameter of which is initially greater than that of the constricted portion 19 of the bush 16. The extension 20 of the conducting rod 13 is passed through the axial bore and when its end projects from the ceramic bush it is drawn through so that the portion 21 of the rod 13 is "wire-drawn" into the constriction 19 thus making a moisture proof metal to ceramic seal. The "drawing-in" of the rod is carried on until the portion of the rod of major diameter abuts against the flare of the ceramic bush. Alternatively the portion 21 of the rod 13 may be made an accurate push fit in the constriction 19 of the bush 16 and then coated with a soft metal which will flow under the applied pressure. The drawing in of the rod 13 spreads the soft metal coating along the constricted bore 19 and thereby forms the moisture proof seal. Circumferential grooves may be formed in the portion 21 of the rod 13 before coating with soft metal in order to accommodate any excess of soft metal displaced in the drawing in process. The main portion of the conducting rod 13 passes through an axial bore in the polythene plug 15 which has a generally cylindrical outer surface tapering inwards towards the high pressure end. The diameter of the main portion of the rod 13 is slightly greater than the diameter of the bore of the plug 15 so as to ensure intimate contact between the polythene and the rod 13. The polythene plug 15 is held in position by a retainer gland nut 22 which is screwed into the bulkhead 6 and which has an internal tapering surface engaging the tapered surface of the plug 15 thus forcing the plug towards the ceramic bush 16.

Water under high hydrostatic pressure can be prevented from reaching the ceramic bush 16 by suitable design of the polythene plug or by the use of deformable sealing rings of known kind, and any slow diffusion of moisture through the polythene is prevented from reaching the interior of the housing by the ceramic bush 16 and the metal to ceramic anti-diffusion seals.

The moulded polythene body 17 serves only to preserve the electrical insulation of the inner conductor over the joint 14.

While the principles of the invention have been described above in connection with specific embodiments, and particular modifications thereof, it is to be clearly understood that this description is made only by way of example and not as a limitation on the scope of the invention.

What we claim is:

1. A method of sealing an electric conductor through a bulkhead separating a comparatively low pressure chamber from a region of much higher pressure which method consists in sealing an insulating bush of suitable material in a passage through said bulkhead, and drawing said electric conductor through a bore in said bush, the bore being of slightly less diameter than a portion of said conductor, whereby the diameter of said portion is reduced to provide a sealing fit in said bore.

2. A method as claimed in claim 1 in which the force exerted on said conductor during said drawing operation exceeds the force exerted upon said conductor in service by the difference in pressure between said region of higher pressure and the pressure in said low pressure chamber.

3. A method as claimed in claim 1 in which said conductor is formed with a shoulder and is drawn into said bore until the said shoulder abuts the end of said bore.

4. A method as claimed in claim 3 in which said shoulder is formed as a substantially conical surface and the end portion of said bore is formed with a complementary shaped surface.

5. A method as claimed in claim 4 in which said portion of said conductor is given a coating of soft metal before being drawn into said bore.

6. A method as claimed in claim 5 in which said coating of soft metal is circumferentially grooved.

7. A method as claimed in claim 5 in which said portion of said conductor is formed with circumferential grooves before the coating of soft metal is applied thereto.

8. A moisture tight seal for an electric conductor passing through a bulkhead separating a comparatively low pressure chamber from a region of much higher pressure comprising an insulating bush provided with a bore, the bore having different size openings, one of said openings being smaller than the cross-sectional dimension of a portion of said electric conductor, and means sealing said bush in a passage in said bulkhead, whereby a portion of the conductor passing through said bore is reduced in cross-sectional size to the size of the smaller opening to form a sealing fit with said bore.

9. A moisture tight seal as claimed in claim 8 in which said portion of said conductor comprises a soft metal coating thereon.

10. A moisture tight seal as claimed in claim 9 in which said portion of said conductor is formed with circumferential grooves.

References Cited in the file of this patent

UNITED STATES PATENTS

| | | |
|---|---|---|
| 1,155,515 | Schmidt | Oct. 5, 1915 |
| 1,349,454 | Heath | Aug. 10, 1920 |
| 2,464,908 | Volkmann | Mar. 22, 1949 |
| 2,490,594 | Madden | Dec. 6, 1949 |
| 2,563,829 | Fitzgerald et al. | Aug. 14, 1951 |
| 2,636,254 | Gunning | April 28, 1953 |
| 2,661,389 | Presswell | Dec. 1, 1953 |
| 2,697,739 | Presswell | Dec. 21, 1954 |